INVENTOR
WILLIAM MOULTRIE

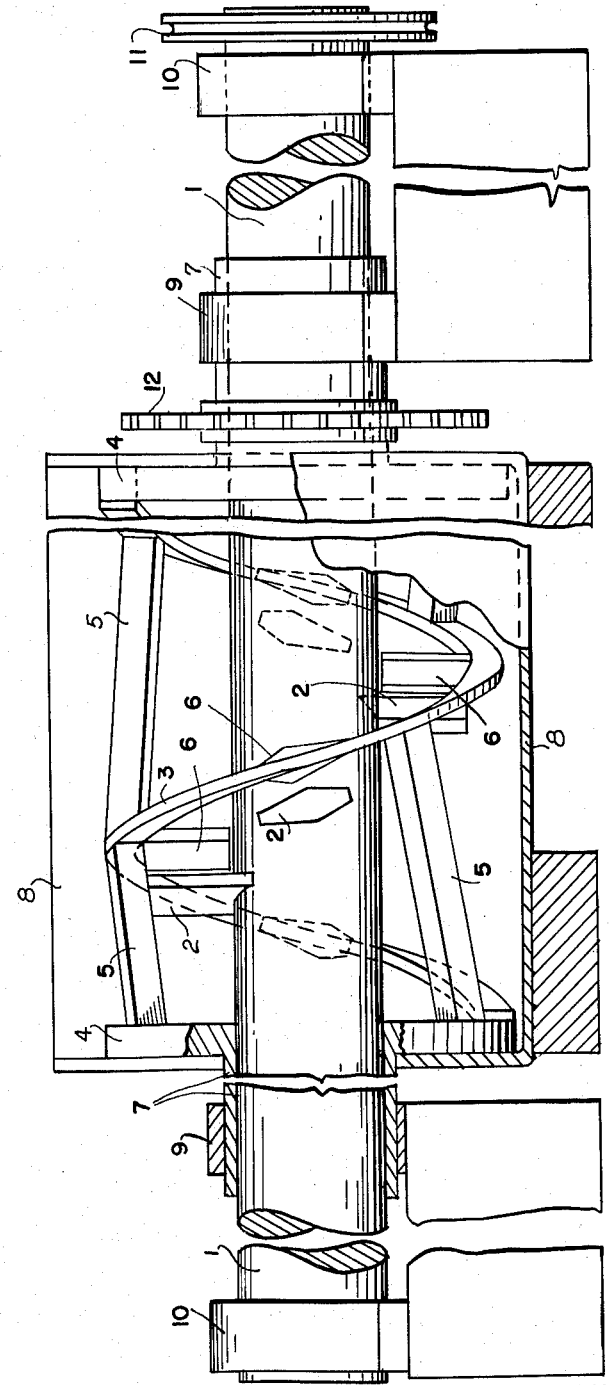

_United States Patent Office_

2,957,681
Patented Oct. 25, 1960

2,957,681

MIXING MACHINES

William Moultrie, Stevenston, Scotland, assignor to Imperial Chemical Industries Limited, London, England, a corporation of Great Britain Filed Mar. 18, 1958, Ser. No. 722,175

1 Claim. (Cl. 259—105)

This invention relates to improvements in mixing machines, suitable for the continuous mixing of solids in loose particle form, a mixture of solids and liquids, pastes, slurries or the like, of the kind comprising a stationary trough-like or tubular container, discharging from one end and having therein a rotatable device, the machine as a whole operating to mix the said materials and gradually move them along the container to the discharge therefrom. Such a machine will be referred hereinafter and in the appended claim, as "a mixing machine of the type described."

Hitherto, mixing machines of this type generally had the rotatable device in the form of a worm with a discontinuous thread which interacts with a plurality of projections or blades extending radially inwards from the container, whereby a combined mixing and propelling effect is imposed on the contents. It is also known to provide the rotatable device with a longitudinal reciprocating motion superimposed on its rotary motion.

According to our invention, a machine of the type described is characterised in that the rotatable device comprises two relatively rotatable elements disposed one within the other and both extending lengthwise of the container.

Preferably at least one of the rotatable elements is provided with projections extending into the container. One of the rotatable elements, preferably the outer one, may comprise a continuous or discontinuous worm suitable for the conveyance of the contents of the container lengthwise along it. If desired, this rotatable element may comprise two worms of different pitch and of opposite hand and the second worm may conveniently be formed by bracing members between the convolutions of the other worm, successive bracing members having the appropriate angular displacement from each other so as to produce the desired pitch and hand.

The projections on one or both of the rotatable elements may be of a variety of shapes; however, in order to secure as great a shearing effect on the contents of the container as possible, it is preferred to use projections which are of greater length than width with wedge-shaped leading and trailing portions; in cross-section they resemble the shape of a conventional coffin. They are preferably orientated so that their major axes form a spiral or worm.

Figure 1:

One embodiment of a mixing machine according to the invention will now be described with reference to the diagrammatic drawings accompanying the provisional specification in which Figure 1 shows an inner rotatable element, Figure 2 an outer rotatable element and Figure 3 a side elevational view partly in section of the said elements assembled inside a trough-like container.

Referring to Figures 1 and 3, 1 is a shaft carrying on its surface 40 blades or projections 2, successive blades being displaced from each other by an angle of 90° and an axial distance of 1½"; thus they lie in a spiral or helical path having a pitch of 6" and 4 blades per pitch. The blades are specially shaped as shown and oriented for a direction of rotation as shown by arrow X. The shaft 1 and blades 2 form the inner rotatable element.

Figure 2:
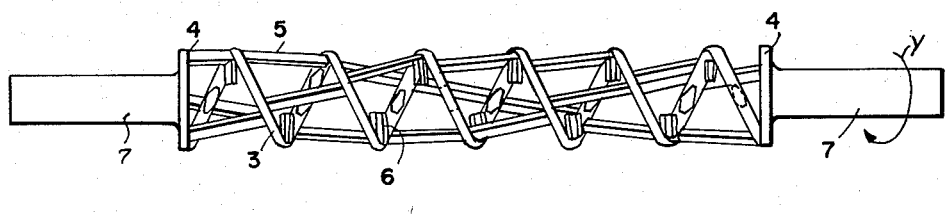

Referring to Figures 2 and 3, the outer rotatable element comprises a spiral feeding means in the form of a worm 3 forming the predominant feeding means having welded to it at each end an angular end plate 4, and likewise welded to it between its adjacent convolutions a plurality of bracing members 5 generally defining a spiral. Distributed over its length are 40 blades or projections 6, which all point radially inwards and are disposed at the same angular displacement from each other and in a spiral or helical path of the same pitch and hand as the blades 2 on shaft 1. The blades 6 are of the same cross-sectional shape as the blades 2, and orientated for a direction of rotation of the outer rotatable element as shown by arrow Y. Three sets of bracing members 5 are welded to the worm 3 between adjacent convolutions thereof, each set being so disposed as to generally define a spiral of opposite hand than said worm 3. Each of the successive members axially in each set are displaced from each other laterally by 1⅛" and the three sets of bracing members are disposed symmetrically about the worm 3, i.e. they are displaced from each other by angles of 120°, and the resulting spirals twist in the opposite direction or hand to that of the worm 3. Tubular extensions 7 are welded to the end plates 4, and are of adequate bore to permit shaft 1 of the inner rotatable element to rotate freely therein; they are each adapted to be supported in a bearing and one of them is adapted to carry externally a co-axial sprocket wheel for connecting the outer rotatable element through a chain to driving means.

Figure 3 shows both rotatable elements assembled in a trough-like container 8. The elements are mounted each in a separate pair of bearings 9 and 10 respectively and are adapted to be rotated in opposite directions by separate driving means (not shown) and at speeds which are independently variable. The inner rotatable element is adapted to be driven via a coupling 11 and the outer rotatable element via a sprocket wheel 12.

What I claim is:

A continuous mixing machine comprising: a container; an outer rotating member disposed in said container; spiral feeding means, having a plurality of convolutions, on said outer rotating member for urging material delivered to one end of said container to the other end thereof while it is being mixed; a plurality of elongated projections attached to said spiral feeding means and extending radially inwardly therefrom, said projections lying in a helical path defined by said spiral feeding means; means interconnecting adjacent convolutions of said spiral feeding means and generally defining a spiral of opposite hand than said feeding means; an inner rotating member disposed within said outer rotating member and adapted for counter-rotation therewith; and a plurality of elongated radial projections attached to and extending outwardly from said inner rotating member, said last-mentioned projections being disposed in a helical path of the same hand as said first-mentioned helical path and adapted to intermesh with said first-mentioned projections.

References Cited in the file of this patent

UNITED STATES PATENTS

| | | |
|---|---|---|
| 62,899 | Stanton | Mar. 12, 1867 |
| 943,735 | Collins | Dec. 21, 1909 |
| 1,442,945 | Hauk | Jan. 23, 1923 |
| 1,478,073 | Van Kuren | Dec. 18, 1923 |
| 1,951,365 | Morrow | Mar. 20, 1934 |
| 2,064,131 | Tuscan et al. | Dec. 15, 1936 |
| 2,761,657 | Rietz | Sept. 4, 1956 |